(12) United States Patent
Turner et al.

(10) Patent No.: US 9,927,954 B2
(45) Date of Patent: Mar. 27, 2018

(54) DYNAMIC INTERFACE TO PRESENT CUSTOMIZED INFORMATION CONTEXTUALLY IN RELATION TO ACCESS TO A PROPERTY

(71) Applicant: HomeAway.com, Inc., Austin, TX (US)

(72) Inventors: Ryan Hedley Turner, Austin, TX (US); Daniel Steven Haligas, Panama City, FL (US); Velayudhan Pillai Venugopal, Austin, TX (US); Alex Holm Devine, Austin, TX (US)

(73) Assignee: HomeAway.com. Inc., Austin, TX (US)

( * ) Notice: Subject to any disclaimer, the term of this patent is extended or adjusted under 35 U.S.C. 154(b) by 289 days.

(21) Appl. No.: 14/594,700

(22) Filed: Jan. 12, 2015

(65) Prior Publication Data

US 2016/0202851 A1 Jul. 14, 2016

(51) Int. Cl.
*G06F 3/0481* (2013.01)
*G06F 9/44* (2006.01)
*G06Q 10/02* (2012.01)
*G06Q 50/12* (2012.01)
*G06Q 50/14* (2012.01)
*G06F 3/0482* (2013.01)
(Continued)

(52) U.S. Cl.
CPC .......... *G06F 3/0482* (2013.01); *G06F 3/0488* (2013.01); *G06F 3/04817* (2013.01); *H04W 4/02* (2013.01); *H04W 4/025* (2013.01); *G06F 9/4443* (2013.01); *G06Q 10/025* (2013.01); *G06Q 50/12* (2013.01); *G06Q 50/14* (2013.01)

(58) Field of Classification Search
CPC ...... G06Q 10/025; G06Q 50/12; G06Q 50/14; G06F 3/04817; G06F 9/4443
See application file for complete search history.

(56) References Cited

U.S. PATENT DOCUMENTS

2007/0039024 A1* 2/2007 Krajcev ................. G06Q 10/02 725/46
2007/0185744 A1* 8/2007 Robertson .............. G06Q 10/02 705/5

(Continued)

*Primary Examiner* — Eric J Bycer
(74) *Attorney, Agent, or Firm* — Knobbe, Martens, Olson & Bear, LLP

(57) ABSTRACT

A wireless mobile device in data communication with a platform may present on a display of the wireless mobile device graphic images and/or icons that may represent different information as a function of time, location, type of activity, type of event, anonymized trend data, push notifications and electronic messages. The graphic images and/or icons may be selectably visible on the display based on context-relevance of the information being displayed relative to an event, such as a rental of property by a traveler, for example. The graphic images and/or icons displayed may be determined by a data file that includes information configured to cause a visual characteristic of the graphic images and/or icons to dynamically change during different periods associated with an event, such as a pre-event, during-event, and post-event periods. Image/icon color, shape, size, opacity, position, transparency, intensity, invisibility, or other visual characteristics may be changed among images/icons being displayed.

20 Claims, 11 Drawing Sheets

(51) Int. Cl.
*H04W 4/02* (2018.01)
*G06F 3/0488* (2013.01)

(56) References Cited

U.S. PATENT DOCUMENTS

| | | | | |
|---|---|---|---|---|
| 2008/0249969 | A1* | 10/2008 | Tsui | H02J 7/0055 706/46 |
| 2009/0163182 | A1* | 6/2009 | Gatti | G06F 9/4443 455/414.1 |
| 2010/0063854 | A1* | 3/2010 | Purvis | G06Q 10/02 705/5 |
| 2010/0191551 | A1* | 7/2010 | Drance | G06Q 10/02 705/5 |
| 2011/0066962 | A1* | 3/2011 | Nash | G06F 9/4443 715/768 |
| 2012/0060101 | A1* | 3/2012 | Vonog | H04N 21/4788 715/751 |
| 2012/0117499 | A1* | 5/2012 | Mori | H04M 1/72569 715/765 |
| 2013/0014040 | A1* | 1/2013 | Jagannathan | G06Q 50/01 715/765 |
| 2013/0080890 | A1* | 3/2013 | Krishnamurthi | G06F 9/4443 715/702 |
| 2013/0085790 | A1* | 4/2013 | Palmer | G06Q 10/02 705/5 |
| 2013/0238370 | A1* | 9/2013 | Wiseman | G06Q 10/02 705/5 |
| 2014/0035949 | A1* | 2/2014 | Singh | G06Q 10/109 345/629 |
| 2014/0201655 | A1* | 7/2014 | Mahaffey | G06F 3/04817 715/765 |
| 2014/0283135 | A1* | 9/2014 | Shepherd | G06F 3/0482 726/29 |
| 2014/0356480 | A1* | 12/2014 | Beaton | B65D 85/72 426/2 |

\* cited by examiner

DYNAMIC INTERFACE TO PRESENT CUSTOMIZED INFORMATION CONTEXTUALLY IN RELATION TO ACCESS TO A PROPERTY

CROSS-REFERENCE TO RELATED APPLICATIONS

This application is related to U.S. patent application Ser. No. 14/562,629, filed on Dec. 5, 2014, and titled "Adaptive Advisory Engine and Methods to Predict Preferential Activities Available at a Region Associated with Lodging", to U.S. patent application Ser. No. 14/562,633, filed on Dec. 5, 2014, and titled "Travel Customization System and Method to Channelize Travelers relative to Available Activities", and to U.S. patent application Ser. No. 14/564,059, filed on Dec. 8, 2014, and titled "Predicting Companion Data Types Associated With A Traveler At A Geographic Region Including Lodging", all of which are hereby incorporated by reference in their entirety for all purposes.

FIELD

The present application relates generally to systems, software, electronic messaging, mobile computing and communication devices, commerce, and electronic commerce. More specifically, systems, devices, methods and software to dynamically change visual characteristics of displayed information associated with an event are disclosed.

BACKGROUND

Users (e.g., a guest, a traveler, a customer, a patron, a client) attending an event may often require relevant information at different times and/or at different locations while attending the event. In an example where the event may be a rental of property a traveler will stay at, relevant information may be dependent on factors such as time and location. As for time, some information may be more relevant to the traveler during different stages of their stay at the vacation rental, such as a pre-stay stage before the traveler has checked-in to the vacation rental, such as driving directions, where to park, etc., a during-stay stage where the traveler may require information to gain access to the vacation rental (e.g., keys or access codes), location of the vacation rental (e.g., in a complex of many similar rental units), locations for entertainment, dining, food, drink, etc., and a post-stay stage where the traveler may need information on check-out procedures, where to buy gas (e.g., if the traveler drove a car), etc.

In some examples, the traveler may be required to obtain relevant information from disparate sources during their stay; however, some of that information may not be contextually relevant for the stage of the stay the traveler is currently experiencing. For example, the traveler need not know a policy for use of swimming pools or location of the swimming pools during the pre-stay stage; however, what may be more contextually relevant to the traveler in preparation for arrival at the vacation rental are driving directions and a helpful list of items to pack. In some circumstances, the traveler may have to rely on other persons to provide the information, and those persons may not be available when the traveler needs them or may provide inaccurate or biased information. As one example, a traveler may desire an espresso drink and may need information on a location for a good espresso shop in walking distance of their vacation rental. Accordingly, information such as a trustworthy recommendation for one or more espresso shops and directions/locations of those espresso shops may be what is needed by the traveler. Ideally, information relevant to the traveler at the different stages of their stay would be provided by a central source that is available to the traveler on a continuous basis, such as 24/7, for example.

Thus, there is a need for devices, systems, methods and software that present contextually relevant information that may be customized for individual travelers.

BRIEF DESCRIPTION OF THE DRAWINGS

Various embodiments or examples ("examples") of the present application are disclosed in the following detailed description and the accompanying drawings. The drawings are not necessarily to scale.

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
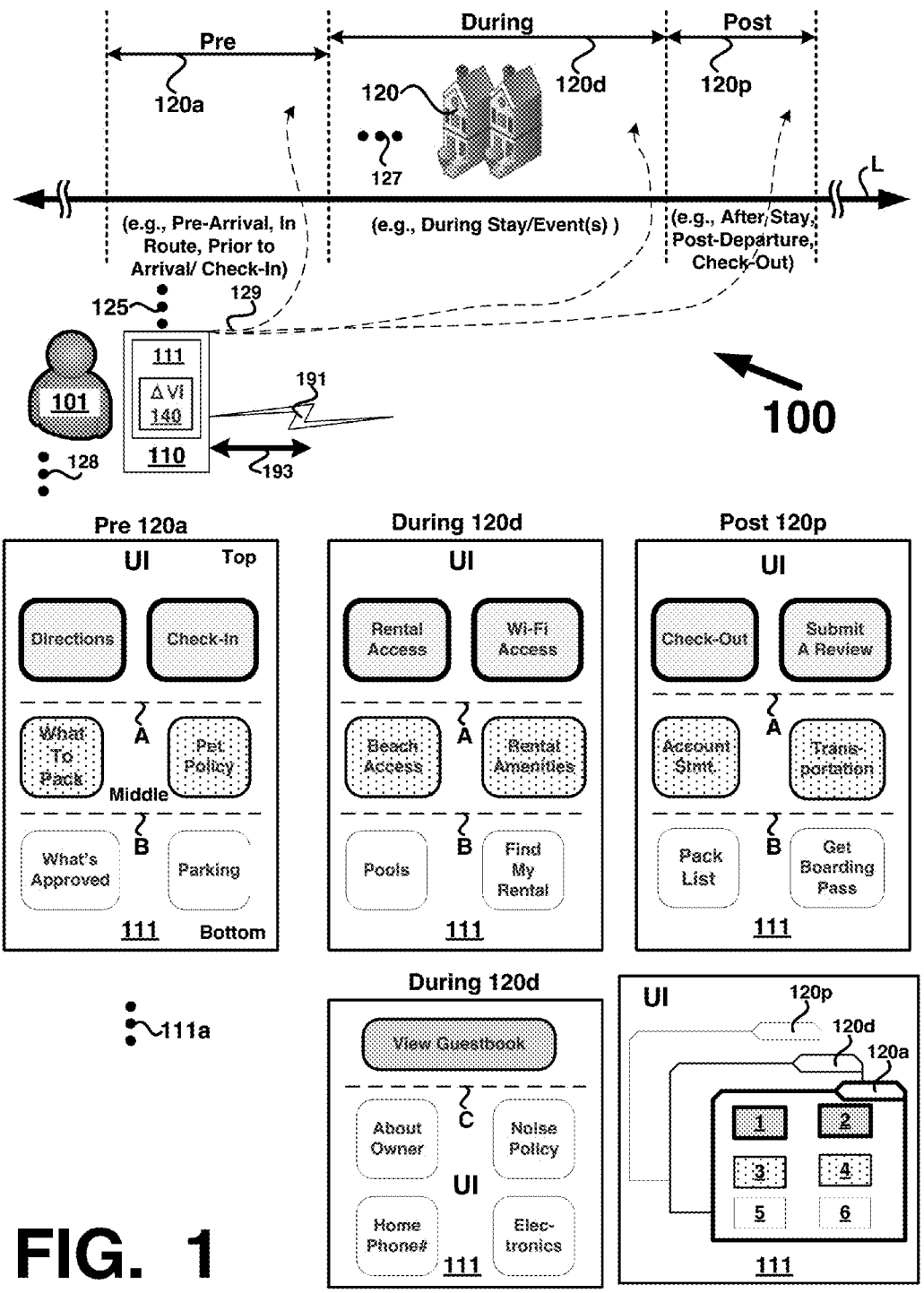
FIG. 1 depicts examples of different event periods of an event and contextually relevant information displayed that may be displayed with visual characteristics that may vary as a function of other information.

Attention is now directed to FIG. 1 where examples 100 of different event periods (120a, 120d, 120p) of an event 120 and contextually relevant information displayed that may be displayed with visual characteristics that may change ΔVi 140 as a function of other information are depicted. In FIG. 1 a user 101 (e.g., a guest, a traveler, a customer, a patron, a client) may be experiencing an event 120 at a location, such as a stay at a vacation rental property, for example. For purposes of explanation the user 101 may be referred to as traveler 101 hereinafter. There may be more than one traveler 101 and there may be one or more other individuals associated with traveler 101 (e.g., spouse, friends, domestic partner, relatives, children, business associates, etc.), as denoted by 128. Traveler 101 may be mobile and may move 129 or otherwise travel to/from one or more other events in addition to event 120 denoted by 127 while at the location, such as visits to bars, restaurants, entertainment venues, businesses, parks, sporting events, local attractions, shopping, etc. The location where one or more events may occur (e.g., event 120 or other events 127) may include but are not limited to a city, a town, a ship, a resort, a park, a festival, a hotel, a motel, etc. The location may cover a small area (e.g., 100 meters or less) or a large area (100 miles or less), for example.

Traveler 101 may have a computing device that includes a display for displaying information, such as a wireless computing device 110 (e.g., a smartphone, tablet, pad, laptop, PDA, gaming device, etc.) that may be in communication with other systems and/or resources, such as a wireless 191 and/or a wired 193 communications link, an external resource (e.g., see 299 in FIG. 2), a networked system (e.g., see 150 in FIG. 2) a wireless access point (e.g., see 230 in FIG. 2), a cellular communications network (e.g., see 277 in FIG. 2), a GPS satellite (e.g., see 287 in FIG. 2), just to name a few. There may be more than wireless computing device 110 as denoted by 125, for example. Traveler 101 may have additional computing devices (not shown), such as a tablet or pad, for example.

In FIG. 1, traveler 101 may have booked a stay at vacation rental 120 (e.g., the event 120) for a predetermined data range at a known location for the event 120 (e.g., the geographical location, address, etc. for the vacation rental). A line L depicts a continuum of time points and/or locations of the traveler 101 at different periods or stages of the stay relative to event 120. For example, period 120a may represent a time and/or location prior to the traveler 101 arriving at the event 120 (e.g., prior to check-in), period 120d may represent a time and/or location where the traveler is present at the event 120 (e.g., after check-in), and period 120p may represent a time and/or location when the traveler is about to depart or has departed from the event 120 (e.g., during or after check-out).

A display 111 of wireless computing device 110 may present information that may be contextually relevant to traveler 101 during different periods 120a-120d of the stay. For example, display 111 may be a touch sensitive display that visually presents information (e.g., icons, images, graphics, or other data) via a user interface (UI), such as a graphical user interface (GUI) for example. In FIG. 1, one or more visual characteristics of the ΔVi 140 of the information presented on display 111 may change or otherwise vary based on other information, such as location data, temporal data, push notifications received on device 110, electronic messages received on device 110, just to name a few, for example. In one example, for the pre arrival period 120a, a user interface (UI) may display contextually relevant information as icons on display 111. Example icons include but are not limited to driving directions, check-in, what to pack, pet policy, what's approved, and parking info. Visual characteristics for the information presented on display 111 may be positioned on display 111 according to their respective relevance for the pre-arrival period 120a. For example, if location data from device 110 and/or temporal data (e.g., traveler 101 is expected for check-in at 3 pm and the current time is 12 pm) indicates that traveler 101 is in route to event 120, then contextually relevant data that may be most likely of interest to traveler 101 may be driving directions and check-in procedures. To that end, icons or other graphic may be positioned towards a top of display 111 (e.g., above dashed line A) and may be visually more striking or otherwise more visually discernable by traveler 101 relative to other icons or images presented on display 111 (e.g., below dashed line A). For example, other icons or images may be presented towards a bottom of display 111 and others at a middle of display 111.

On the other hand, prior to departing to travel to the event 120, contextually relevant data that may be most likely of interest to traveler 101 may be what to pack (e.g., swimming gear if there is a pool, beach or lake, etc.), for the stay and what pet policy is in force for the event 120 (e.g., no pets allowed or only leashed pets, etc.). As another example, other contextually relevant data that may be most likely of interest to traveler 101 but of lower urgency may be positioned below dashed line B on display 111, such as what's approved (e.g., a smoking policy) and where to park upon arrival at the event. The icons presented on display 111 may be displayed with differences in visual characteristics, such that icons above dashed line A are visually most prominent, icons between lines A and B are less visually prominent than the icons above line A, and icons below line B are the least visually prominent than the icons above line B.

As the traveler 101 progresses through pre period 120a, the positions, content, and visual characteristics of the information may change dynamically as a function of other information including but not limited to location data and temporal data. As one example, an application 126 (APP) executed on a processor of wireless computing device 110 may be configured to cause display of the information on display 111. Initially, three days prior to departing for event 120, what to pack and pet policy may be presented above line A with the highest visual prominence because at that time and/or location, a packing list and pet policy may be more contextually relevant to traveler 101 than driving directions, check-in information, what's approved, or parking. Later, 12 hours before departing for event 120, the directions and check-in may be displayed above line A as described above. Finally, later still, 30 minutes before check-in time (e.g., at approximately 2:30 pm) the what's approved and parking icons may be presented with greater visual prominence above line A than other icons below line A.

As context changes as a function of location, time or other data, icons or other information may be repositioned on display 111, be added to display 111, be removed from display 111, undergo a change in visual characteristics such as color, intensity, opacity, transparency, size, shape, resolution, orientation, etc., for example. In some example, icons or other information presented on display may be configured to be selectable (e.g., activated) by touch, a cursor, a stylus, voice command, or user input device such as a keyboard, mouse or the like. In other examples, changes in context may configure one or more icons or other information to be un-selectable notwithstanding the fact that the icon/information is being displayed on display 111. As one example, during the pre-arrival period 120a, during period 120d or post-departure period 120p, the icons above dashed line A may be selectable (e.g., may be activated to cause some action) and icons below lines A and B may be un-selectable. As context changes and icons that were previously above line A are repositioned below line A and other icons are positioned above line A, the icons above line A may be selectable and the icons below lines A and B may be un-selectable. Lines A and B are non-limiting examples of how information may be demarcated on display 111 and other arrangements of icons or information may be used and may be application dependent. In other examples, icons that are not contextually relevant during a particular period may be queued for display at a time and/or location where they become contextually relevant to the traveler 101.

Additional non-limiting examples of icons or other information that may be displayed include those relevant to the during stay period 120d. For example, post check-in, traveler 101 may need timely information on access to the rental unit 120 (e.g., a key, an access code, etc.) and information on how to access a wireless access point (e.g., 230) in the rental unit 120. The UI may display with greater visual prominence an icon for rental access and another icon for Wi-Fi access above dashed line A. Here, an owner 103 of the rental 120 may have provided the SSID and wireless network key to a system (e.g., networked system 150) and that information may be made available to traveler 101 during period 120d by activating the Wi-Fi access icon. The APP 126 may access a wireless networking resource of device 110 and provide the SSID and network key in response to the traveler 101 activating the Wi-Fi access icon, thereby allowing the traveler 101 to access to a wireless network using device 110. Similarly, a key code for an electronic door lock or a key code for a key lock box necessary to gain access to the rental 120 may be presented to the traveler 101 by activating the rental access icon above line A. Other information may be presented on display 111 but may not be visible until scrolled or otherwise brought into view, such as icons for view guest book, about owner, noise policy, a home phone number for the rental 120 and information about electronics (e.g., cable TV, stereo, etc.) in the rental 120. Scrolling, moving or other action may be used to cause icons that are not active (e.g., cannot be selected) or displayed with less visual prominence into view on display 111 and/or cause to be displayed with greater visual prominence relative to other icons. For example, after checking in, gaining access to rental 120, and accessing the Wi-Fi access point, traveler 101 may move the icon for beach access above line A to cause that icon to be displayed with greater visual prominence relative to other icons and/or cause that icon to become selectable, so that the traveler may find out how to access beaches in vicinity of the rental 120.

In the post-departure 120p period, check-out and review submission icons may initially be displayed with greater visual prominence relative to other icons. Other icons for an account statement, ground transportation (e.g., to the airport), a packing list, or to print a boarding pass may be presented, for example. There may be more or fewer icons and/or UI's than depicted in FIG. 1 as denoted by 111a.

In other examples, UI may present contextually relevant information in another form, such as in one or more tabs or folders for each period (120a, 120d, 120p) for the event 120. As one example, during the pre-arrival period 120a, the tab for 120a may be visually more prominent than tabs for 120d and 120p, and icons 1 and 2 may be visually more prominent than in the tab for 120a than icons 3-6, with icons 3 and 4 being visually more prominent than icons 5 and 6, but less visually prominent than icons 1 and 2. Tabs 120d and/or 120p may or may not be selectable until they become more contextually relevant (e.g., as the traveler 101 gets closer to check-in or check-out).

Information displayed in UI may change dynamically as the traveler 101 moves about 129 during the different periods 120a-120p. For example, while the traveler 101 moves 129 about during period 120d, other events that may be of interest to traveler 101 may be presented on display 111, such as bars, coffee shops, restaurants, bicycle shops, shopping, groceries, or other attraction in vicinity of the event 120.

Figure 2:
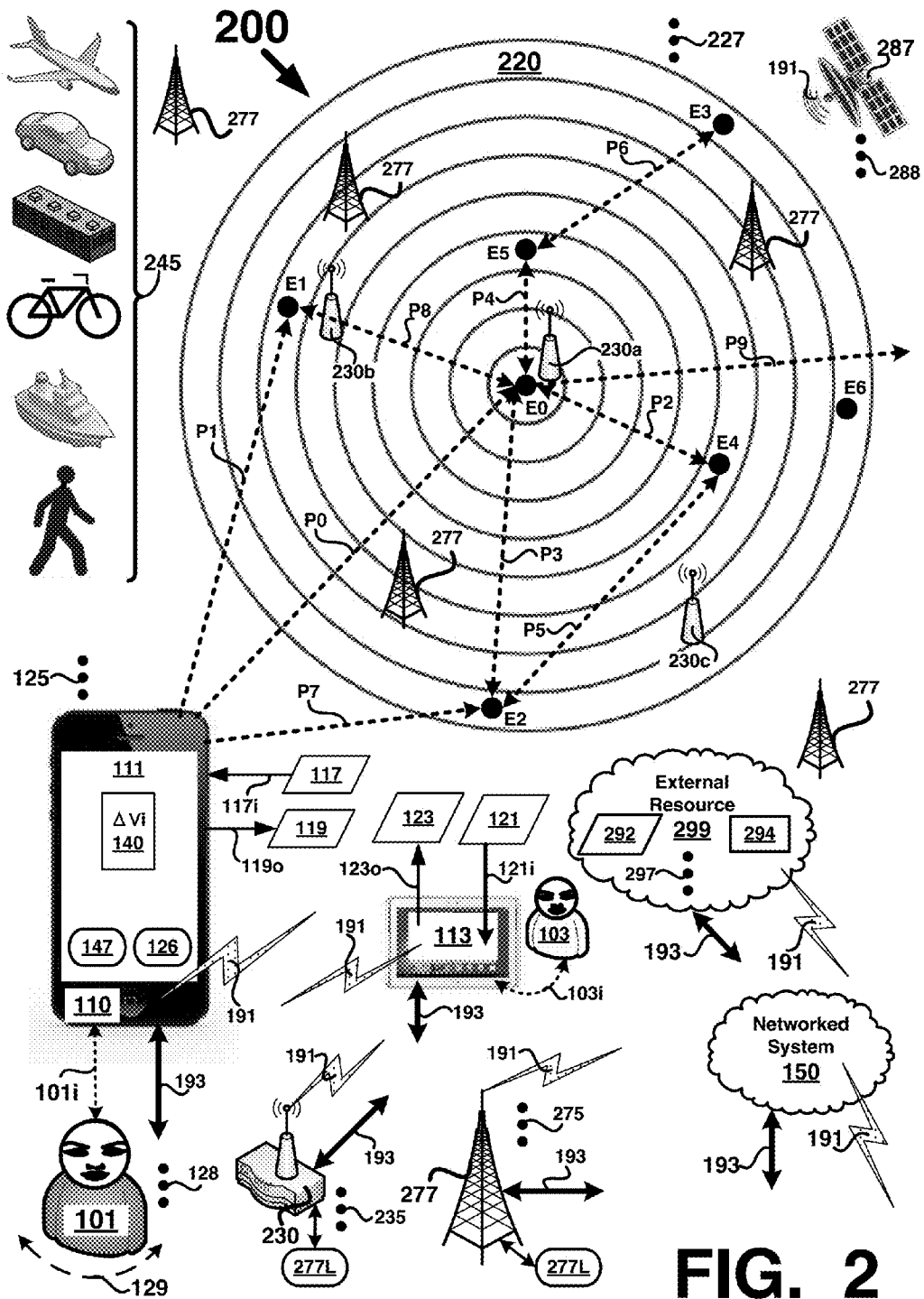
FIG. 2 depicts examples of a wireless computing device that may present contextually relevant information with visual characteristics that may vary as a function of other information.

Turning now to FIG. 2 where examples 200 of a wireless computing device 110 that may present contextually relevant information with visual characteristics that may vary as a function of other information is depicted. In FIG. 2, wireless computing device 110 may be in communication with other devices and/or systems via wireless 191 and/or wired 193 communications links. One or more wireless access points 230, 230 a-230 c, one or more cellular communication networks 277, and one or more satellites 287 (e.g., GPS satellites) may be in communication with device 110, networked system 150, and external resource 299 (e.g., the Internet, the Cloud, etc.). An owner device 113 may also be in communication (191, 193) with one or more of the other devices and/or systems depicted in FIG. 2. External system 299 may include computing resources 294 and/or data storage resources 292 and there may be more or fewer of those resources as denoted by 297. There may be more or fewer wireless access points 230, cellular communications networks 277 and satellites 287 than depicted in FIG. 2 as denoted by 235, 275 and 288. Data communications between the wireless computing device 110 and the networked system 150 or other systems may be direct (e.g., via 191 and/or 193) or may be routed through one or more other portal computing devices, such as wireless access points 230 and/or cellular communications networks 277, for example.

Wireless access points 230, 230a-230c, one or more cellular communication networks 277, and device 110 may generate location data, such as location history data 147 in device 110 and location data 277L in access points and cellular networks. Device 110 and other systems and devices may obtain location data from satellite 287. The location data may be accessed by networked system and/or device 110 to determine the location of traveler 101 based on location of the wireless computing device 110 as the traveler moves 129 through the various periods of the stay for the event. For example, traveler 101 may take one or more modes of transportation denoted by 245 to arrive at the event. Here, the main event for traveler is denoted by E0. Event E0 may be a vacation rental, for example. Circle 220 may represent a region around event E0 that the traveler 101 may move 129 about in to/from other events denoted as E1-E5. As traveler 101 begins travel, the aforementioned pre-arrival 120a related information may be dynamically displayed on display 111 of device 110 and visual characteristics of the information may change as denoted by ΔVi 140.

As one example, if traveler 101 takes a path P0 directly to the event E0, then information displayed on device 110 may be like the previous examples in FIG. 1 in regards to the pre-arrival period 120 a. However, the traveler 101 may not take path P0 and instead may take paths P1 and P8 to get to event E0. Networked system 150, owner device 113, wireless computing device 110 may use location data and/or temporal data (e.g., paths P1 and P8 may delay arrival beyond the 3 pm check-in time) to determine other events along paths P1 and P8 that may be contextually relevant to the traveler 101 during the stage 120 a. As one example, if traveler 101 is driving by car to event E0, the information presented on display 111 may include an event E1 for a gas station for refueling the car or a diner were the traveler 101 may stop and eat. A visual characteristic of an icon for a gas station or diner may be altered to garner the attention of the traveler 101 of a potential event (e.g., event E1) that may be of interest to the traveler based on its location on path P1 or other information such as time of day (e.g., it's lunch time), distance traveled since departure for event E0 (e.g., it's time to refuel the car), etc.

Location information for event E1 and other information about what goods, services, amenities, etc. that traveler 101 may partake of at event E1 may be included in a data store accessed by networked system 150 and/or information from owner 103 who may be familiar with various events, such as E1, in the region 220 around event E0. Traveler preferences and or demographic information may be included in the data store and/or device 110. As the location of traveler 101 nears event E1, APP 126 executing on a processor of device 110 and/or computing resources 294 in networked system 150 may operate to change information displayed on device 110 based on changing context as the traveler 101 moves 129 toward the event E0. As another example, if traveler 101 takes path P7 instead of path P1 or P0, then contextually relevant information displayed on device 110 may be different than would be the case if path P0 or P1 had been taken. For example, if traveler 101 is riding a bicycle, then event E2 for a bicycle shop/tavern along path P7 may be presented on display 111 with greater visual emphasis to alert the traveler of a potentially relevant destination on the way to event E0.

Upon arrival at event E0, information on display 111 may be changed (e.g., moved to top of display above line A) to reflect information more contextually relevant to traveler 101 during period 120d of the stay. Other events E2-E5 in region 220 may be presented on display 111 with visual characteristics that may emphasize some information and may deemphasize other information, for example, as was described above in regards to FIG. 1. One or more of the events E2-E5 may be predetermined based on traveler history with visits to region 220, traveler demographic information, traveler preference information, etc. Some of the events E2-E5 may be dynamically determined based in location data being tracked from device 110 or other systems such as 230, 277, 287, for example. As one example, if data on traveler 101 indicates the traveler 101 likes Mexican cuisine, then location data indicating the traveler 101 has moved 129 (e.g., along path P2) to a location close to a Mexican restaurant denoted as event E4 may be processed by networked system 150 and/or device 110 to generate a data file configured to present information about event E4 on display 111 with a visual characteristic intended to garner the traveler's attention as to his/her proximity to event E4. As one example, data representing the data file may be communicated (e.g., 191, 193) to the display 111 of device 110 via a communications interface of a computing device (e.g., networked system 150). Contextually relevant information may be a function of more than location data. For example, if it's 2 am in the morning and traveler is on path P2, the information on event E4 may not be presented on display 111 due to temporal data (e.g., data from a clock in device 110) or other data (e.g., traveler preference data) indicating it is too late for the traveler to be eating.

Other events may be dynamically presented on display 111 by push notifications, electronic messages or other data transmitted (e.g., 117, 123) by a device or system, such as owner device 113 and/or networked system 150. Owner 103 may promote his/her own business interests in region 220 by sending electronic messages and/or push notifications that are received by device 110. Networked system 150 and/or device 110 (e.g., via APP 126) may process the electronic message or push notification to generate information for display on device 110. Owner 103 may interact 103i with the wireless computing device 103 to draft electronic messages, push notifications or other data transmitted 123 by device 113.

Merchants or proprietors of businesses, services, etc. in region 220 may have access to traveler data (e.g., via an account granting access to networked system 150) and may use electronic messaging, push notifications or other mediums that may be processed by 110 and/or 150 to display that information on device 110 for the relevant period (e.g., 120a, 120d, 120p) during event E0. As one example, event E5 may be a coffee shop located in a downtown area near event E0. A proprietor of the coffee shop may send an electronic message or push notification to networked system 150 which may process the information and generate a data file that is transmitted to device 110 to cause an icon or other image for event E5 to be presented on display 111. The merchants or proprietors may not have any relationship to event E0 (e.g., to a rental property) in order to participate in access to data about traveler 101 and/or to send electronic messages or push notifications to traveler's device 110. The merchants or proprietors may use a computing device similar to 113 or 110 to access data and send electronic messages or push notifications.

Upon departure from event E0 (e.g., at check-out time), traveler 101 may take a path P9 to exit region 220. During post-departure period 120p, an event contextually relevant to traveler 101 may be presented on display 111 with appropriate visual characteristics (e.g., at top of display 111, with high contrast and high image brightness relative to other icons). For example, if traveler 101 is traveling in an electric car, event E6 may be presented as an icon for an electric car charging station near path P9 that the traveler 101 may decide to use to recharge the car on the return trip home from event E0.

Figure 3:
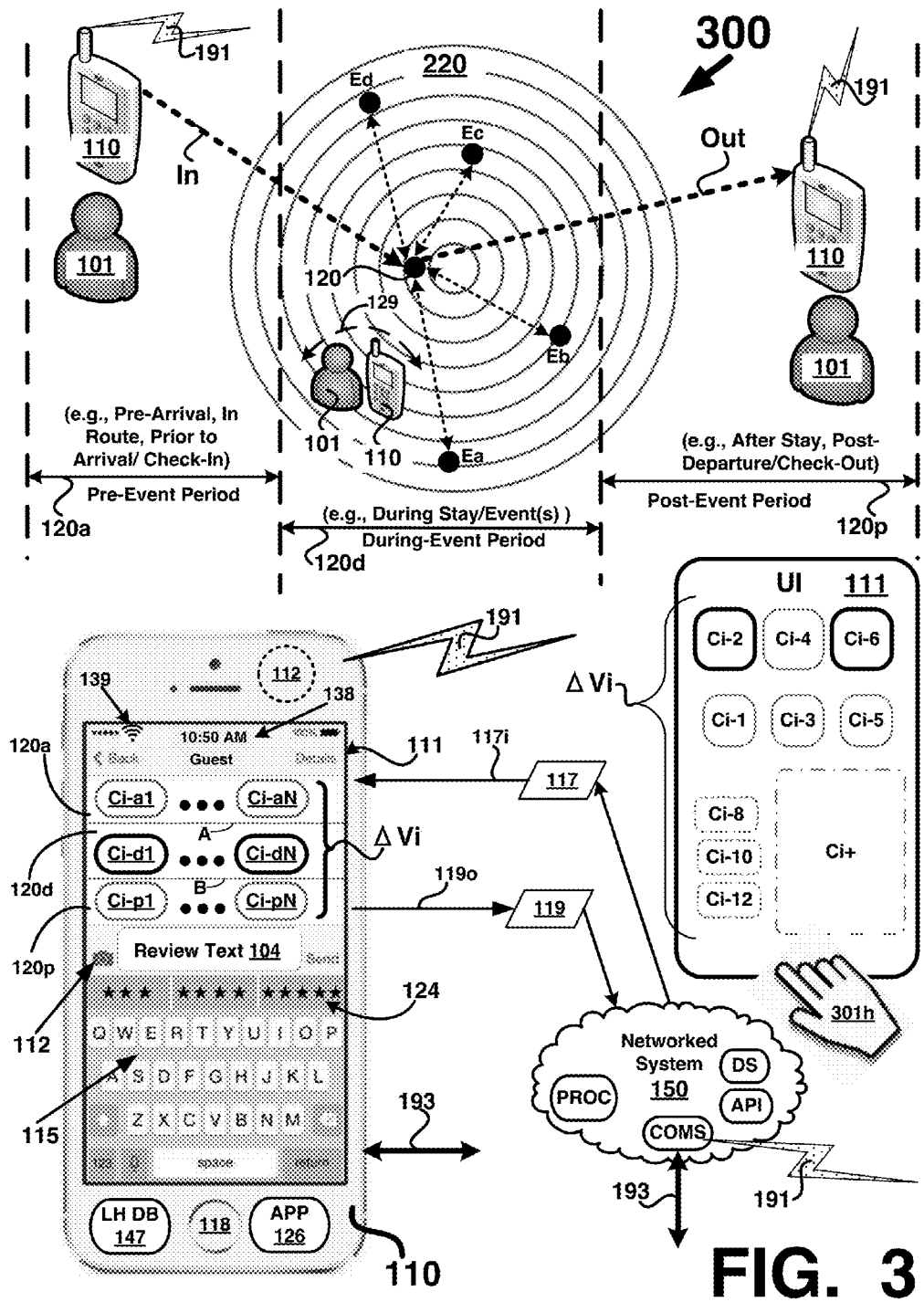
FIG. 3 depicts examples of images of contextually relevant information presented on a user interface of a display.

Moving on to FIG. 3 where examples 300 of images of contextually relevant information presented on a user interface of a display are depicted. In region 220 of FIG. 3, traveler 101 may during the pre-arrival period 120 a arrive at the region 220 for event 120 (e.g., a stay at a vacation rental unit) as denoted by dashed arrow In. During the event 120, traveler 101 may experience other events Ea-Ed in region 220 as the traveler 101 moves 129 about during the stay. At the end of the stay the traveler 101 may depart region 220 as denoted by the dashed arrow Out. Display 111 of device 110 may include contextually relevant images "Ci" for each of the three periods 120 a, 120 d and 120 p and images (e.g., icons, graphics, etc.) for those periods may be positioned at different places on display 111, such as period 120 a above line A, period 120 d between lines A and B, and period 120 p below line B, for example. Visual characteristics for images Ci may be varied ΔVi among images Ci within the same period and/or among images Ci in different periods. For example, in the during event period 120 d, images Ci-d1 through Ci-dN may be more prominent in appearance than images Ci-a1 through Ci-aN and Ci-p1 through Ci-pN positioned above and below lines A and B because the traveler 101 may be presently experiencing event 120 and other events Ea-Ed in region 220 therefore making images associated with those events more contextually relevant to the traveler 101 at that stage of the stay. Accordingly, Ci-d1 through Ci-dN are depicted in dark line to illustrate their greater visual prominence on display 111 relative to images Ci-a1 through Ci-aN and Ci-p1 through Ci-pN that are depicted in lighter line to illustrate their lower contextual relevance to the traveler 101 during period 120 $d$. On the other hand, during arrival to event 120, images Ci-a1 through Ci-aN for period 120 $a$ may be more prominent than other images for periods 120 $d$ and 120 $p$, and during departure, images Ci-p1 through Ci-pN for period 120 $p$ may be more prominent than other images for periods 120 $a$ and 120 $d$. A data file 117 is generated by and transmitted by resources in networked system 150 (e.g., processor-PROC, data storage-DS, communications interface-COMS, application program interface-API). Device 110 may receive the data file 117 and APP 126 may process data in the data file 117 to generate the contextually relevant images for display 111. Information in data file 117 may be used by APP 126 to determine the visual display characteristics for the images Ci. Information in data file 117 may be used by APP 126 to determine which images Ci are selectable on display 111, which images Ci are visible on display 111, and other display parameters such as position, size, shape, color, intensity, opacity, transparency, contrast, resolution, motion of images Ci, animation of images Ci, etc., for example.

Display 111 may be a touch sensitive display that may include images Ci that may be touch activated by a finger on a hand 301$h$ of traveler 101, for example. Some images Ci may be selectable for touch activation, such as images Ci-2-Ci-6 and Ci-1-Ci-5. Other images Ci may not be selectable, such as images Ci-8-Ci-12 as denoted by dashed lines for those images. Other images may not be visible on display 111, such as image Ci+. Images Ci-2 and Ci-6 may be more visually prominent than other images as denoted by heavy line. Activation of image Ci-6 may be operative to cause image Ci+ to become visible. For example, image Ci-6 may be an icon for a tavern event Ed in region 220 and activation via 301$h$ may cause a map for directions to event Ed to be displayed as image Ci+. Therefore, image Ci+ may become visible upon activation of another image on display 111.

Networked system 150 may receive data 119 from device 110 (e.g., via APP 126). Data 119 may include information on which images Ci are selected by traveler 101, location data from device 110, temporal data from device 110, for example. Data 119 may be used to update or add to a location history data base for traveler 101, to learn traveler preferences based on other events experienced during event 120, to update demographic information on traveler 101, etc., for example.

In FIG. 3, during the post-event period 120$p$, data 117 may include a request for traveler 101 to submit a review and an image Ci (e.g., icons Ci-p1-Ci-pN) may be selected by the traveler 101 and APP 126 may be configured to cause a keyboard 115 to be displayed on display 111 for entry of review text 104 (e.g., free text) and may cause a menu 124 for a star rating system (e.g., structured text for 1-5 stars) to be displayed. The request may include a suggestion for the traveler 101 to capture an image with a camera 112 on device 110 prior to leaving the event 120 (e.g., a picture of a room or view from the vacation rental). The review data, including any content such as an image, may be transmitted as data 119 to networked system 150.

Figure 4:
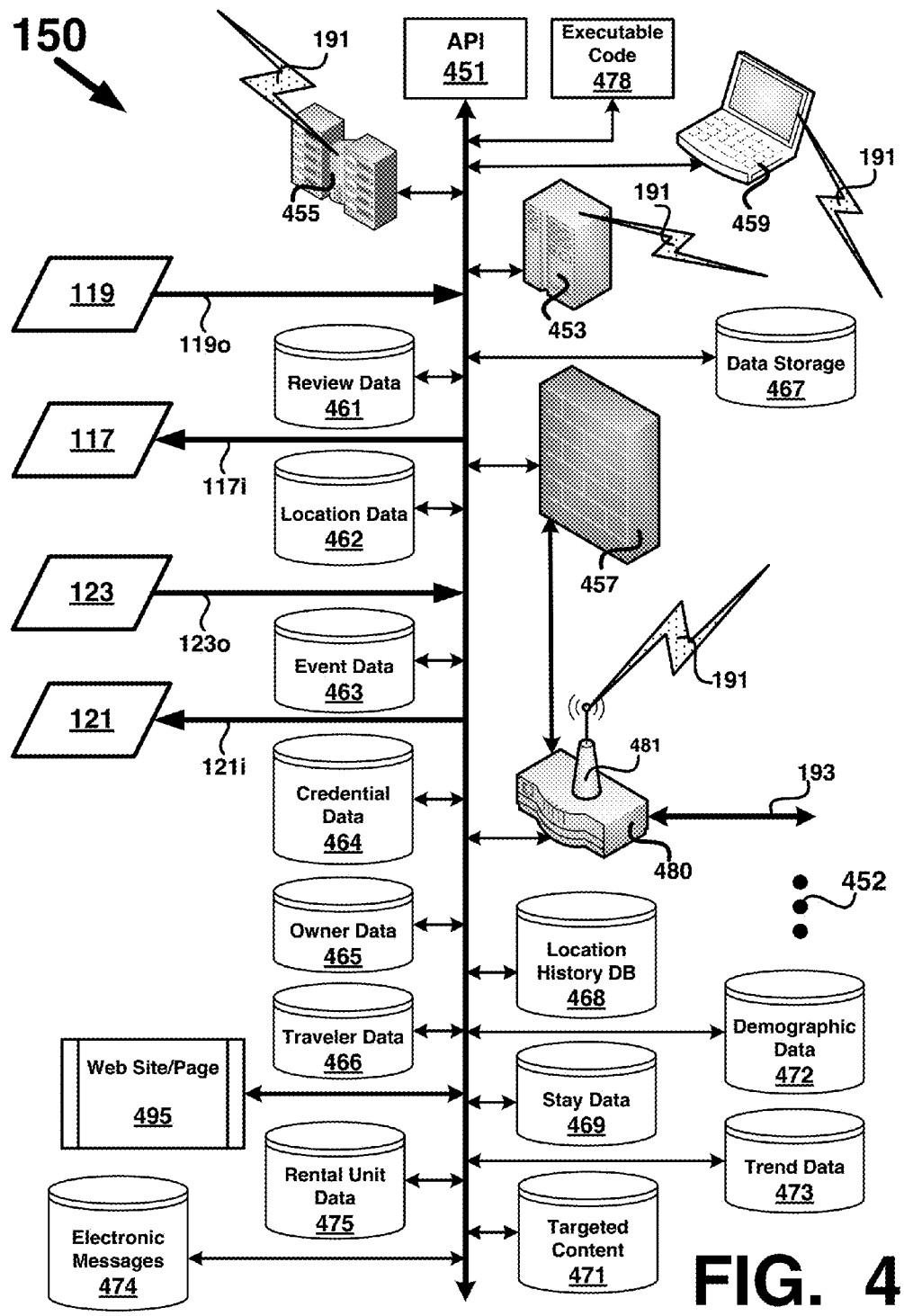
FIG. 4 depicts one example of a networked system.

Reference is now made to FIG. 4 where one example of a networked system 150 is depicted. Networked system 150 may be in wired 193 and/or wireless 191 communications with other devices and systems, including but not limited to external resource 299 and its associated resources (292, 294), traveler device 110, owner device 113, and other computing devices, just to name a few. Networked system 150 may include resources in communications with one another, that may include but is not limited to an application program interface (API) 451, executable code 478, one or more laptop computers 459, one or more servers 453, a communications interface 480 that may include wireless 191 and wired 193 links, firewall 457, one or more server farms 455, data storage 467, review data 461, location data 462, location history data 468, (e.g., a location history data base), event data 463, credential data 464, owner data 465, traveler data 466, stay data 469, demographic data 472, trend data 473, targeted content 471, rental unit data 475, and electronic messages 474. In some examples, data storage 467 may include one or more of the other data storage categories (e.g., 461-475). In other examples, data storage resources accessed by networked system 150 may be external to networked system 150 (e.g., positioned in external resource 299). One or more of the flows depicted in FIGS. 8-9 may be implemented using executable code 478 and/or API 451, for example. For purposes of explanation, a computing resource (e.g., 453, 455, 459) depicted in FIG. 4 may be referred to as a networked computing device and a data storage resource (e.g., 461-475) may be referred to as data storage. For example, data 119 may be received by networked computing resource 453 via communications interface 480. In some examples, a computing device that transmitted the data 119 may be referred to as a client device (e.g., 110) or a portal computing device (e.g., 230, 277).

Traveler device 110 and/or owner device 113 may communicate (191, 193) with networked system 150 via a Web Site/Web Page 495 (e.g., using a browser or application on a laptop, PC, wireless device, smartphone, pad, tablet, touch screen device, etc.). Information (117, 119, 121, 123) may be viewed, entered, transmitted, received, or otherwise communicated (191, 193) between networked system 150 and another device (e.g., 110, 113, etc.) using Web Site/Page 495. Reviews, amended reviews or other data associated with event 120 or other events (e.g., Ea-Ed or E1-E6) may be communicated via Web Site/Page 495. Network service 150 may require access be granted to a device (e.g., 110, 113, etc.) prior to allowing data communication with the networked service 150 via Web Site/Page 495. Traveler device 110 may include a biometric sensor 118 (e.g., a fingerprint scanner) to verify access credentials for data communications between networked system 150 and device 110, for example.

Review data 461 may include review data and/or amended review data (119, 123), and may include formatted reviews for publication to other users of networked system 150. Review data 461 may include location data and/or credential data from a computing device (e.g., 110) that may be compared to location data in 462 and/or credential data in 464. Review data 461 may include review data files for formatted reviews and may include amended review data files. In some examples, data 119 and/or 123 may include amended review data.

Location data 462 may include locations (e.g., GPS data and/or other location data) associated with events (e.g., events in 220) and locations around events (e.g., in approximately the same locale as an event). Examples of location around an event may include but are not limited to a park across the street from an event, a cafe of coffee shop down the street from an event, etc. Examples of owner locations may include location data associated with use of the owner device 113, such as location data from cellular networks (e.g., in the city or state the owner lives in), WiFi networks, WiMAX networks, etc.

Event data 463 may include data for events, such as a stay at a vacation rental (e.g., event 120), an entertainment venue, a bar, a grocery store, a bakery, goods, services, business, restaurants, etc. that may be the primary event for traveler 101 or may be associated with activities the traveler 101 partakes in during his/her stay at the primary event (e.g., the stay at the vacation rental 120). Event data 463 may be data for one or more events E0-E6 or Ea-Ed, for example.

Location history data base 468 may include location data tracked and stored over time based on various locations visited by traveler 101 with a computing device (e.g., device 110) that includes or has access to internal/external sources of location data, such as satellite 287, access points 230, cellular networks 277, etc. Validation of location may include accessing data in location data 462, location history data base 468, or both. In some examples, a computing device that communicates the data 119 may include location history data base (LH DB) 147 which may include the same or different data than location history data base 468. In some examples location data in one of the location history data bases may be used to update and/or replace location data in the other location history data base. For example, location data in LH DB 147 of device 110 may be received 119 and stored in location history data base 468. As another example, location data in location history data base 468 may be received 117 and stored in LH DB 147. Data in location history data base (468, 147) may be used to predict based on past location history, a future location of traveler 101 and that predicted location may be used to generate contextually relevant information that is presented on display 111. For example, if traveler 101 walks from event 120 to a shopping district in region 220 every morning during period 120*d*, then events located in the shopping district may be displayed on device 110 during each morning of the traveler's stay.

Credential data 464 (e.g., access credentials, user name, password, etc.) may be a data store where access data is retained for various events, owner properties, etc. For example, credential data 464 may include credentials for WiFi access points in owner properties, businesses that may be promoted by the owner 103 or by an agent acting on behalf of the owner, etc. Other forms of credentials may be included in credential data 464, such as access credentials for traveler devices (e.g., 110), locks on doors needed to gain access to a rental property or other protected area associated with a stay at an event (e.g., event 120), for example.

Demographic data 472 may include data about a large pool of travelers, including traveler 101. Demographic data may be based on zip code data, income data, spending pattern data, travel data, and other data about travelers that may be used to determine habits, preferences, education, profession, occupation, spending power, financial worth, etc. Demographic data about traveler 101 that is accessed from traveler data 466 may be compared with demographic data from a larger pool of similar travelers in demographic data 472 to make predictions on behavior, activities, events, and other characteristics associated with traveler 101 that may be used to determine what types of information to present on display 111 during different periods (120*a*, 120*d*, 120*p*) of an event.

Trend data 473 may include real time data on trends occurring in the region 220 associated with an event (e.g., event 120). Trend data 473 may be included in data (119, 123) and may be provided by travelers (e.g., 101 or others), owners (e.g., 103), media sources, reviews, tweets, emails, or other forms of electronic media and/or messaging. Trend data 473 may be used to compose content for electronic messages or push notifications (e.g., 474) that may be communicated (117, 121) to computing devices (e.g., 110 and/or 113). Images (e.g., Ci) presented on display 111 may be associated with trends in region 220 of the travelers stay. For example, if kite flying is trending in region 220, an icon for a store selling kites may be presented on display 111 in a portion of the display assigned for images associated with event period 120*d*, for example.

Targeted content 471 may include data directed to a traveler (e.g., 101) based on one or more of traveler demographics, preferences, location, location history, spending patterns, etc., just to name a few. Targeted content 471 may be communicated to device 110 as an electronic message or push notification, for example. An owner 103 and/or proprietor having access to networked system 150 may compose targeted content 471 at one or more travelers whose location coincides with a business interest of the owner/proprietor. For example, a proprietor of a skate board shop who has information on travelers in region 220 (e.g., traveler 101 or other travelers) that indicates those travelers have an interest in skate boarding, may target content for skate board purchase, rental or parts to those travelers.

Electronic messages 474 may be a data store for incoming and/or outgoing electronic messages, such as emails, push notifications, push events, and electronic messages generated by networked system 150, for example. Electronic messages 474 may include data in 117, 121, 119 and 123, for example. Electronic messages 474 may be presented on display 111 or web site/page 495, for example.

Rental unit data 475 may include information on a rental unit (e.g., event 120) that may be accessed by traveler 101, such as amenities, rental policies (e.g., no smoking, no pets), parking, maps, address information, electronic devices in the rental unit, appliances, maintenance contact information, owner information, emergency information, policies for use of facilities (e.g., swimming pools, workout room, club house, etc.), just to name a few.

Owner data 465 may include data about owners (e.g., 103), such as property addresses, owner address and contact information, email accounts, account information for a vacation rental agency the owner uses to manage stays by guests, data on owner devices 113 (e.g., MAC address or other forms of device ID, etc.). Traveler data 466 may include data about travelers (e.g., 101), such as addresses and contact information, email accounts, guest demographics, data on traveler devices 110 (e.g., MAC address or other forms of device ID, etc.), financial accounts for deposits, payments, refunds, etc. Stay data 469 may include data for an event such as stay dates, check-in/check-out times/dates, event address, event categories for different types of events (e.g., vacation rental events, restaurant events, casino events, etc.). Data storage 467 may be used as a data store that may be accessed by other components internal to and/or external to networked system 150. Networked system 150 may include more or fewer resources than depicted in FIG. 4 as denoted by 452.

Figure 5:
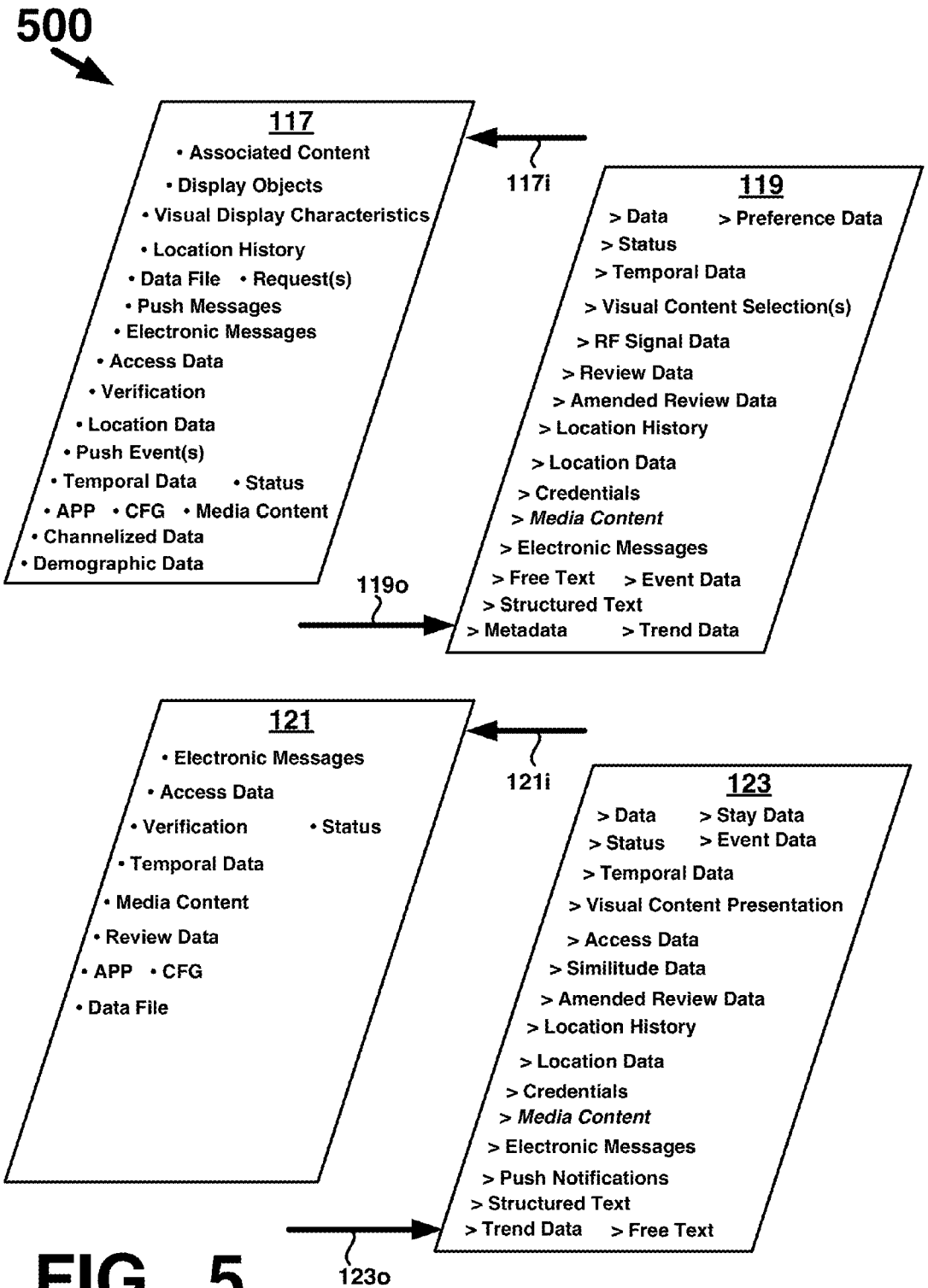
FIG. 5 depicts examples of data that may be generated or received by a computing device.

In FIG. 5 examples of data that may be generated (119, 123) or received (117, 121) by a computing device (e.g., 110, 113, 453, 459, 455, 294) are depicted. Incoming data 117*i* and/or 121*i* received by devices 110, 113 may be generated by networked system 150. Data to control visual content presentation on display 111 of device 110 may be included in data 117. Data 117 may include different data at different times, at different event periods (120*a*, 120*d*, 120*p*), and at different locations, for example. Data 117 may be a display data file generated by networked system 150 and/or computing device 110 and the display data file may include information to control visual content presentation on display 111, such as described above in FIGS. 1-3, for example. Owner device 113 may output 123o data 123 and that data may include information to control visual content presentation on display 111 (e.g., networked system may process data 123 to generate data 117). Data 117, 119, 121, 123 may include more or less data than depicted.

Figure 6:
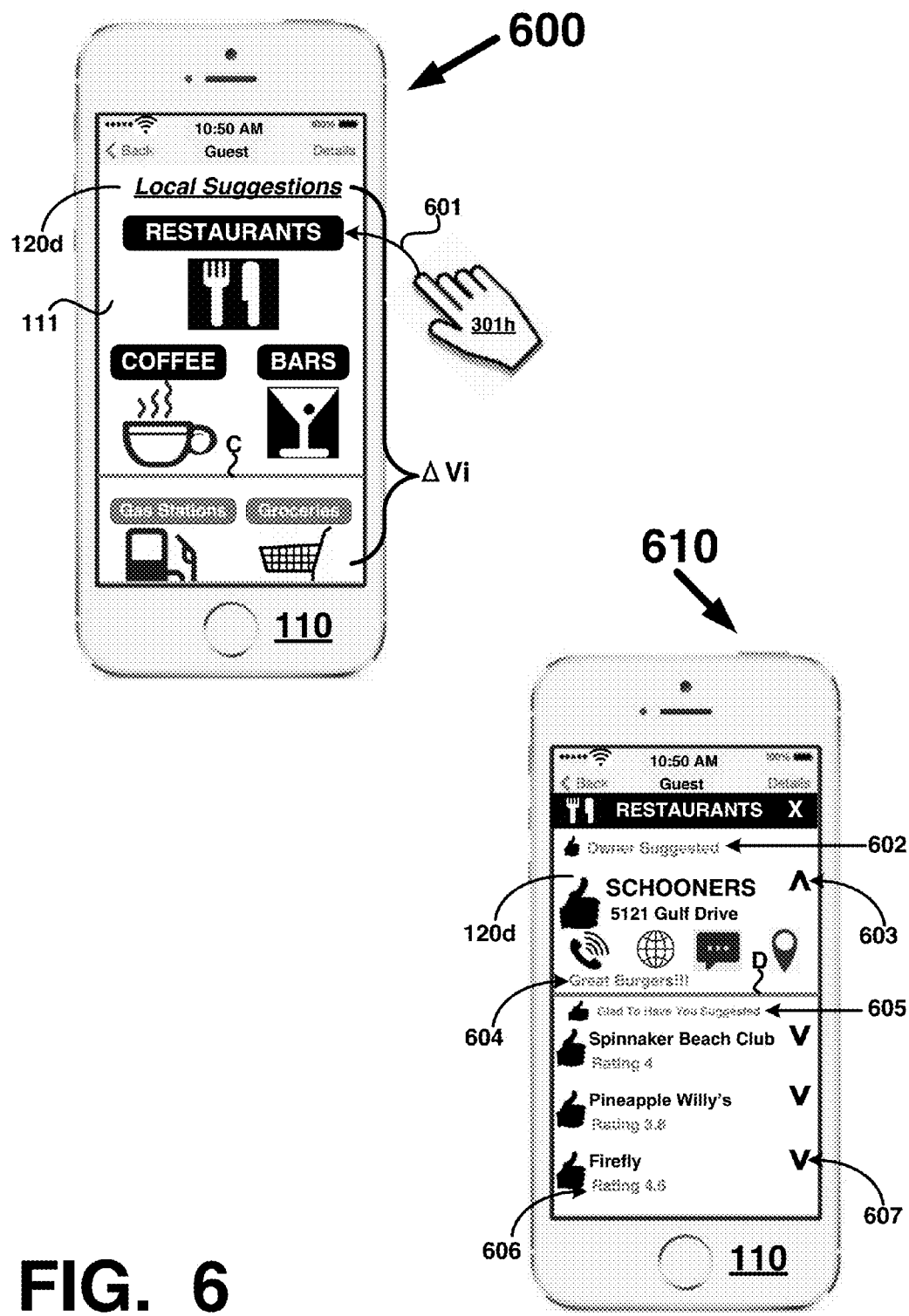
FIG. 6 depicts examples of images of contextually relevant information presented on a user interface of a display of a wireless computing device.

Turning now to FIG. 6 where examples 600 and 610 of images of contextually relevant information presented on a user interface of a display 111 of a wireless computing device 110 are depicted. In example 600, traveler 101 may be in the during-stay period 120d of the event 120 and therefore contextually relevant information displayed on display 111 of device 110 may include local suggestions for restaurants, coffee and bars as denoted by their respective icons on display 111. Location data indicating traveler 101 is at a location near businesses that provide food, coffee or drink, along with temporal data (e.g., a time of day when food, coffee, or drink are consumed) may be processed by networked system 150 and/or device 110 to generate a display data file that has the icons depicted in example 600. Icons for gas stations and groceries are also presented on display 111, but with less visual prominence (e.g., light background) and position (e.g., below line C) than the other icons which have dark background and are positioned above line C. The delta in visual characteristics ΔVi in the images displayed may be determined by the contextual relevance of food, coffee or drink superseding the traveler's 101 need for groceries or gas based on data such as location data, temporal data, location data (e.g., rate of change of location data is slow) indicating the traveler is walking and not driving, and therefore may not need gas or may not be able to transport groceries, etc.

In example 600, traveler 101 selects 601 the restaurant icon and display 111 may transition to the images depicted in example 610. In example 610, the restaurant icon expands to reveal several restaurant choices, some of which are suggested 602 by the owner 103 of the vacation rental 120 and others suggested by "Glad to Have You" 605. Suggestions 605 may be by a vacation rental agency that facilitates rental of the vacation rental unit 120. In example 610, the traveler may select one or more of the suggested restaurants, such as selecting 603 the owner suggested restaurant "Schooners" which causes a menu to appear that has selections to call the restaurant, get directions to the restaurant, get information on the restaurant, etc. Owner 103 may include an owner endorsement, review or comment about "Schooners", such as "Great Burgers!!!". Owner 103 may receive financial remuneration for each traveler who patronizes "Schooners" as a result of the owner supplied suggestion.

Below line D of display 111 in example 610, the "Glad to Have You" suggested restaurants may be displayed with less visual prominence (e.g., positioned below line C and with smaller font size) than the owner suggested restaurant. Review data from previous patrons of the three "Glad to Have You" suggested restaurants may be presented for each restaurant, such as 4 rating for Spinnaker Beach Club, 3.8 rating for Pineapple Willy's and 4.6 rating for Firefly. Traveler 101 may decide to select 607 Firefly based on its higher 4.6 rating.

Figure 7:
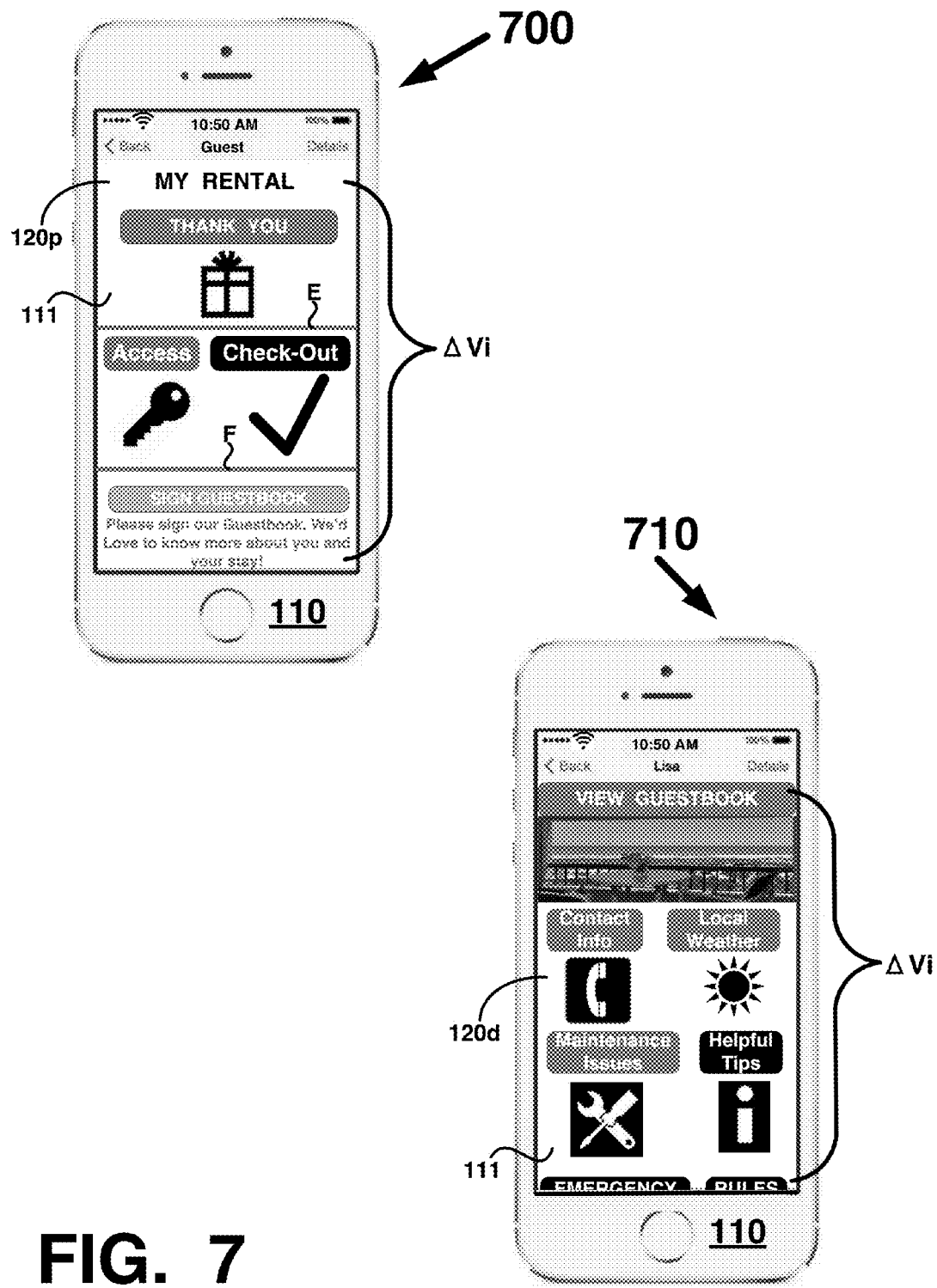
FIG. 7 depicts other examples of images of contextually relevant information presented on a user interface of a display of a wireless computing device.

In FIG. 7 other examples 700 and 710 of images of contextually relevant information presented on a user interface of a display 111 of a wireless computing device 110 are depicted. In example 700, the traveler 101 may be in the post-event period 120p and may be in the process of checking-out of the vacation rental 120, for example. Information may be presented above and below lines E and F on display 111. An "thank you" icon may appear above line E and a "sign guestbook icon" may appear below line F; however, what may be more contextually relevant to traveler 101 is the check-out icon displayed with greater visual prominence that the other icons on display 111 due to the traveler 101 beginning the check-out process. On the other hand, in example 710, the traveler may be in the during-stay period 120d and icons on display 111 may include view guestbook, contact info for the owner and/or rental agency, local weather conditions/forecast, maintenance issues (e.g., leaking plumbing, broken dishwasher), helpful hints, emergency, and rules. Here, icons for helpful hints, emergency, and rules are displayed with greater visual prominence than the other icons, but the emergency, and rules icons are partially off display 111 and therefore may be of lesser importance to traveler 101 than the helpful hints which may provide the traveler 101 with timely information about the rental unit, amenities, etc. The other icons although being displayed with less visual prominence may be selectable if the traveler 101 chooses to activate them. The emergency and rules icons that are partially off display 111 may be scrolled into view if the traveler 101 so chooses.

Figure 8:
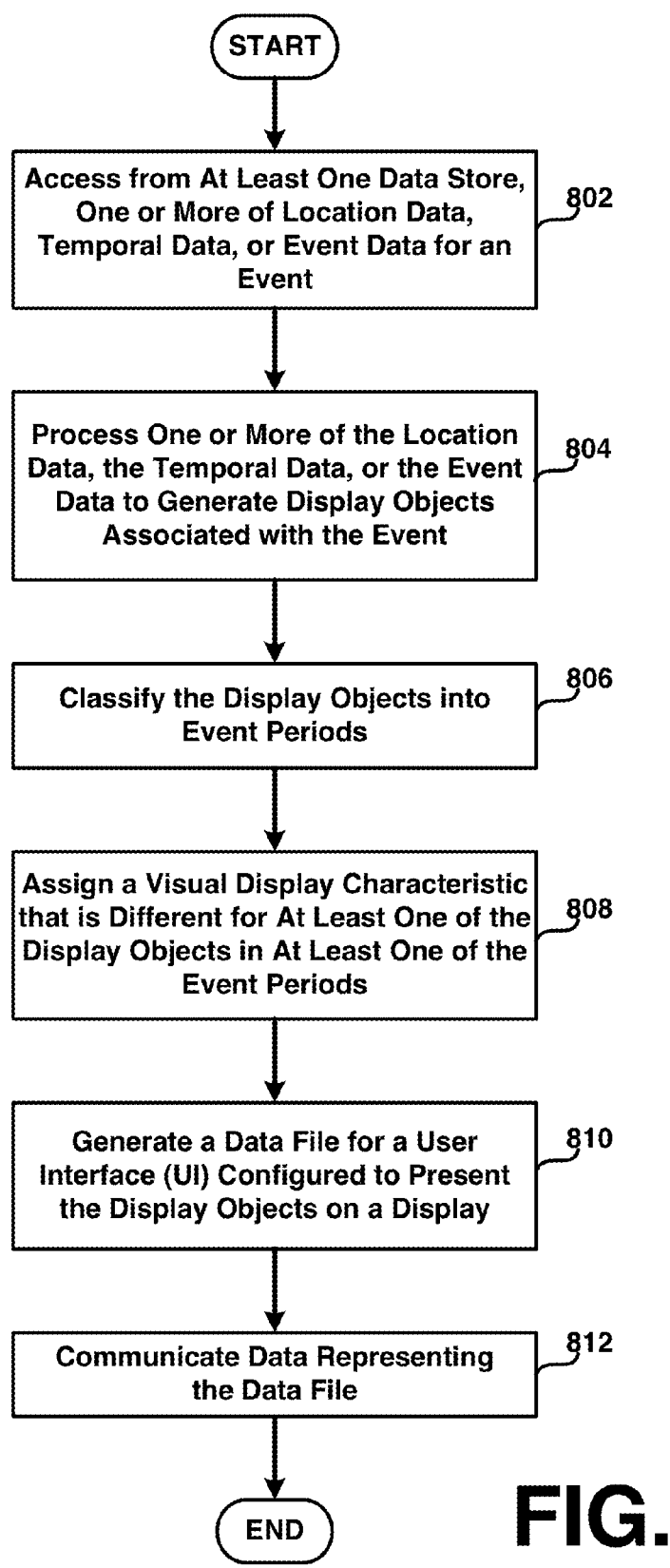
FIG. 8 depicts an example of a flow diagram for generating a data file.

FIG. 8 depicts an example of a flow diagram 800 for generating a data file. At a stage 802 at least one data store is accessed for one or more of location data, temporal data, or event data for an event (e.g., event 120, Ea-Ed, E0-E6). The data store may be a data base or data storage in networked system 150, external resource 299, memory internal to device 110, and memory internal to device 113, for example. For example, temporal data may be accessed from one or more data stores including but not limited to stay data 469, traveler data 466, event data 463, data storage 467, and rental unit data 435, for example. Location data may be accessed from one or more data stores including but not limited to location data 462, location history DB 468, location history DB 147, location data 277, and memory in device 110, for example. Event data may be accessed from one or more data stores including but not limited to event data 463, rental unit data 475, stay data 469, traveler data 466, owner data, 465, and data storage 467, for example.

At a stage 804 one or more of the location data, temporal data, or event data may be processed to generate display objects associated with the event. The display objects generated may be configured for display on a display (e.g., 111) of a computing device (e.g., 110). APP 126 in computing device 110 or other computing device in which APP 126 is installed, may be configured to process the display objects for display with associated visual characteristics on a display of the device in which the APP 126 is installed. APP 126 may be device and/or operating system (OS) specific, such as for iOS™ or Android™ operating systems. APP 126 may be installed on a computing device, such as device 110, via an application store, such as the Apple® app store or the Google® play store, for example. APP 126 may be configured to present the display objects on a display of a computing device by interfacing with appropriate systems such as processors, graphics processors, memory, touch screen digitizer, and other systems of the computing device. The display objects may be configured to generate the icons depicted in FIGS. 1, 6 and 7 for example.

At a stage 806, the display objects may be classified into event periods, such as periods 120a, 120d and 120p as described above. Events may include more or fewer periods than the examples described herein and the number of event periods is not limited to three (e.g., 120a, 120d and 120p). Each event period may include display objects that are classified for it, such as those depicted in the example 100 of FIG. 1. Temporal data, location data, and event data may be used to classify the display objects into their respective event periods.

At a stage 808 a visual display characteristic may be assigned to at least one of the display objects in at least one of the event periods and the visual display characteristic may be different for at least one of the display objects in at least one of the event periods. Examples of visual display characteristics that may differ between event periods or within event periods may include the example 300 of FIG. 3 where icons Ci-d1-Ci-dN for event period 120d are visually more prominent (e.g., depicted in dark line) than the icons above line A (event period 120a) and below line B (event period 120p) (e.g., depicted in light line). In example 600 of FIG. 6, within the same event period 120d, the visual display characteristic for the icons above line C includes larger upper case text on a black background; whereas, the icons below line C include different visual display characteristics of text on a light background and only a portion of the icons being presented on display 111, unlike the icons above line C that are presented in full. In example 610 of FIG. 6, in the same event period 120d, the owner suggested restaurant icons/images are larger than those for the icons below line D.

At a stage 810 a data file may be generated for a user interface (UI) configured to present the display objects on a display (e.g., displayed with their respective visual display characteristics). The data file may be a data structure, a data packet or other arrangement of data that may be transmitted or otherwise communicated by a computing device or system, such as networked system 150, external resource 299, or wireless computing device 110, for example. The generated data file may be a portion of the data in data 117, for example. The data file may be formatted for a particular computing device and/or operating system (OS). The data file may include different packets or fields for display objects classified into the different event periods.

At a stage 812 data representing the data file may be communicated (e.g., via 191, 193). As one example, data representing the data file may be communicated wirelessly to another computing device, such as wireless computing device 110 of the traveler 101. The data representing the data file may be included in data 117 received by the wireless computing device 110. In other examples, the data representing the data file may be communicated to a web site/web page, such as web site/page 495.

Figure 9:
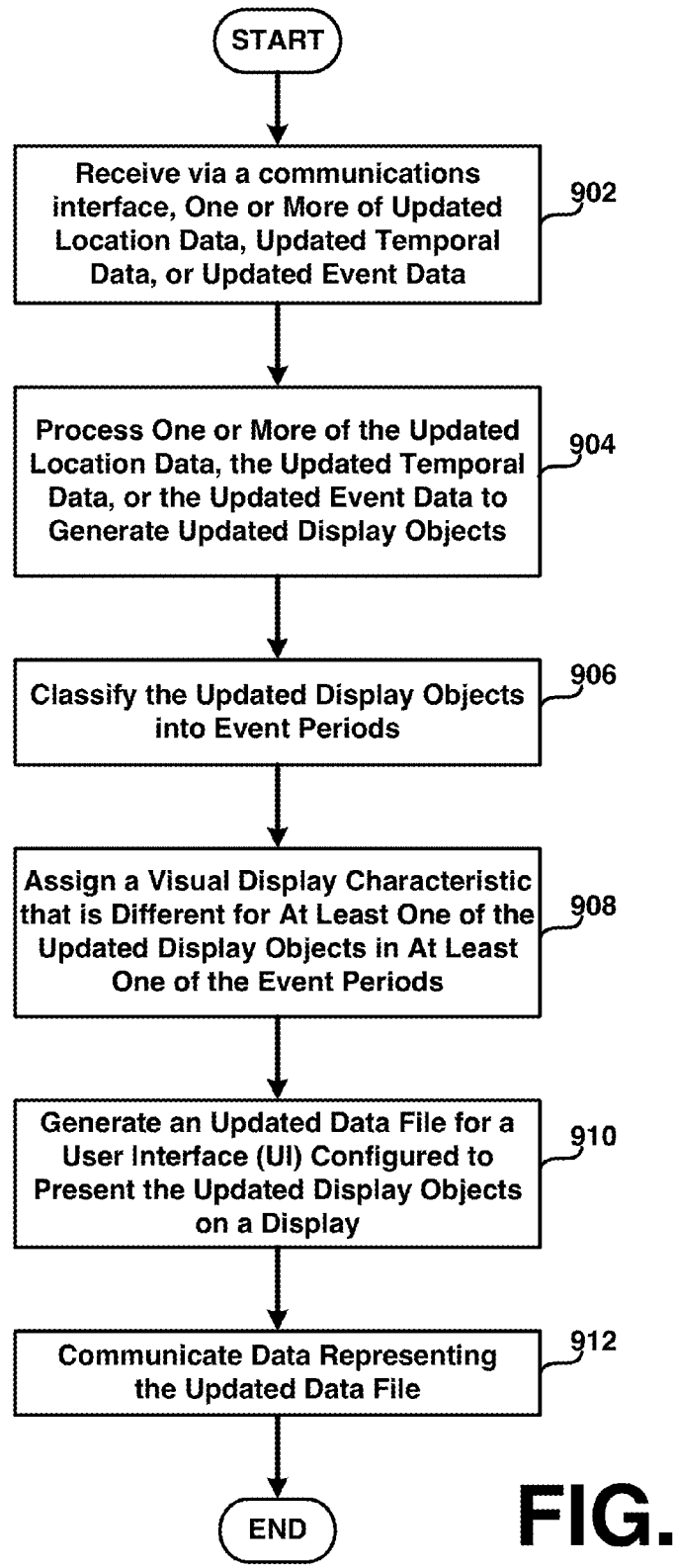
FIG. 9 depicts an example of a flow diagram for generating an updated data file.

FIG. 9 depicts an example of a flow diagram 900 for generating an updated data file. Stages of flow 900 may be similar to those described above for flow 800 of FIG. 8. As the location of traveler 101 changes due to movement 129 (e.g., in region 220), different events, push notifications, electronic messages, and other data that may be contextually relevant to the traveler 101 may be dynamically presented on display 111 of device 110. As one example, if the restaurant Firefly in example 610 of FIG. 6 is completely booked and cannot accept any more reservations, then networked system 150 may access another event for presentation on display 111 below line D and that event may replace the restaurant Firefly. Accordingly, the data file may be updated as necessary to present timely information for traveler 101 to consider.

At a stage 902, one or more of updated location data, temporal data, or event data may be received at a communications interface (e.g., 480). At a stage 904, one or more of the updated location data, temporal data, or event data may be processed (e.g., by networked system 150) to generate updated display objects. At a stage 906, the display objects may be classified into different event periods. At a stage 908 a visual display characteristic that is different for at least one of the updated display objects may be assigned to at least one of the event periods. At a stage 910 an updated data file for the user interface (UI) may be generated. At a stage 912, data representing the updated data file (e.g., 117) may be communicated (e.g., via 191, 193). As one example, data representing the updated data file may be communicated wirelessly to another computing device, such as wireless computing device 110 of the traveler 101. The data representing the updated data file may be included in data 117 received by the wireless computing device 110. In other examples, the data representing the updated data file may be communicated to a web site/web page, such as web site/page 495.

Figure 10:
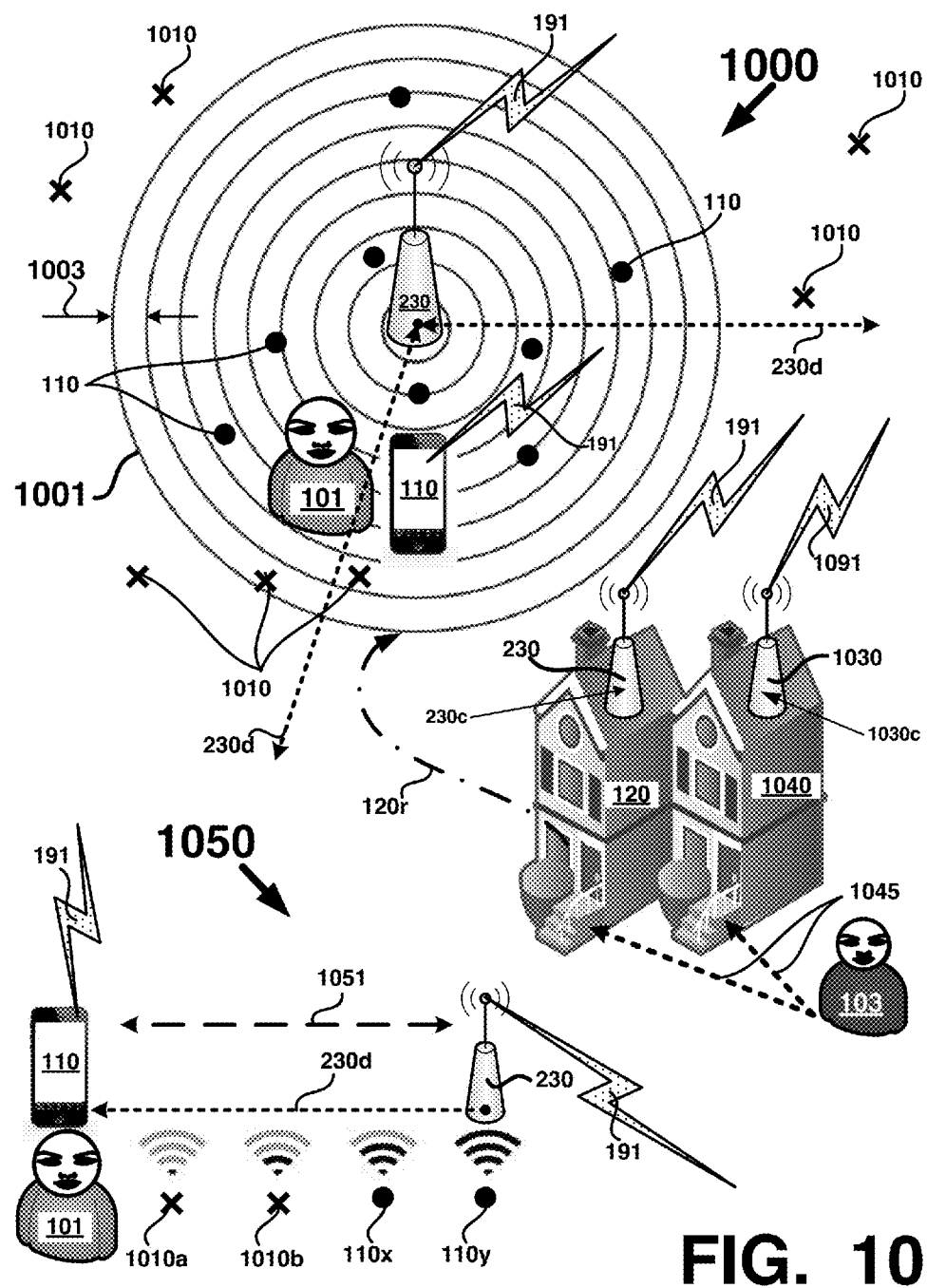
FIG. 10 depicts examples of a threshold for an allowable distance for an allowable location.

Attention is now directed to FIG. 10 where examples 1000 and 1050 of a threshold for an allowable distance for an allowable location are depicted. In example 1000 the event 120 is a stay at a vacation rental unit where traveler 101 and his/her wireless computing device 110 are present. WiFi access point 230 (e.g., a portal computing device) is positioned in the rental unit 120 and includes access credentials 230c. Concentric circles 1001 depict a radial distance 230d centered about access point 230 (e.g., in a room 120r of the vacation rental) where a threshold for an allowable distance denoted as a black dot "•" for device 110, for an allowable location (e.g., event 120) may be used by a computing device (e.g., 453, 455, 459, 110, 113) to determine and/or update location data (e.g., 277L, 462, 117, 119, 121, 123), to update location history data (e.g., 147, 462), for example. For purposes of explanation a distance 1003 between adjacent circles in 1001 may be 3 meters, for example. Distances that are not an allowable distance (e.g., they are too distant from locations related to the event 120) are denoted by a "x" 1010 and some of those distances may fall outside of circle 1001.

For example, as a distance of the from access point 230 increases along radial distance 230d wireless computing device 110, the number of non-allowable locations associated with "x" 1010 may increase; whereas, as the distance of the wireless computing device 110 from access point 230 decreases along radial distance 230d, the number of allowable locations associated with "•" 110 may increase. Although, wireless access point 230 is depicted as device that may be used to determine location of the traveler 101 (e.g., based on RF signals from device 110 associated with traveler 101), other devices such as 277 and/or 287 may be used to determine location and the example depicted in FIG. 10 is not limited to the In example 1050, as the wireless computing device 110 moves closer to or further away from access point 230 as denoted by dashed line 1051, a RF signal parameter may change as a function of distance along radial distance 230d. As an example, RSSI or RF signal strength associated with 1-bar 1010a or 2-bars 1010b for "x" 1010 may be indicative of the wireless computing device 110 being outside the allowable distance. On the other hand, at closer distances to access point 230, RSSI or RF signal strength associated with 3-bars 110x or 4-bars 110y for "•" 110 may be indicative of the wireless computing device 110 being inside the allowable distance. As another example, review data and/or media content in review data captured by wireless computing device 110 at "x" 1010 may result in the data 119 not being validated as to location and data communications access to the networked computing device may be denied. However, review data and/or media content in review data captured by wireless computing device 110 at "•" 110 may result in the data 119 being validated as to location and data communications access to the networked computing device may be allowed. Hardware, software, circuitry, RF systems or the like in access point 230 may include signal strength data indicative of a relatively strong signal (e.g., 4 to 5 bars), an adequate signal (e.g., 3 bars), or a relatively weak signal (e.g., one to two bars) in data 119. The signal strength data may be used by the networked computing device to validate the location data. APP 126 may access systems of wireless computing device 110 (e.g., RF system) and include signal strength data (e.g., see RF signal strength indicator 139 in FIG. 3) in the data 119 and that may be may be used by the networked computing device to validate the location data.

Further to example 1000, an owner 103 may own 1045 both rental units depicted (e.g., 120 and 1040). An access point 1030 with access credentials 1030c in rental unit 1040 may be detected (e.g., via its RF signal 1091) by and may even be accessed by wireless computing device 110 of traveler 101. For example, another guest in rental unit 1040 may give the access credentials for access point 1030 to traveler 101. However, data 119 transmitted by wireless computing device 110 using access point 1030 may not be authenticated due to the credential data in 119 not matching the access credentials assigned to event 120. Use by traveler 101 of access point 1030 to communicate data 119 to/from networked computing device may result in credential data not being authenticated and data communications access being denied. For example, review data included in the data 119 may be rejected by networked system 150 due the data 119 not originating from a location and/or credentials associated with event 120.

Figure 11:
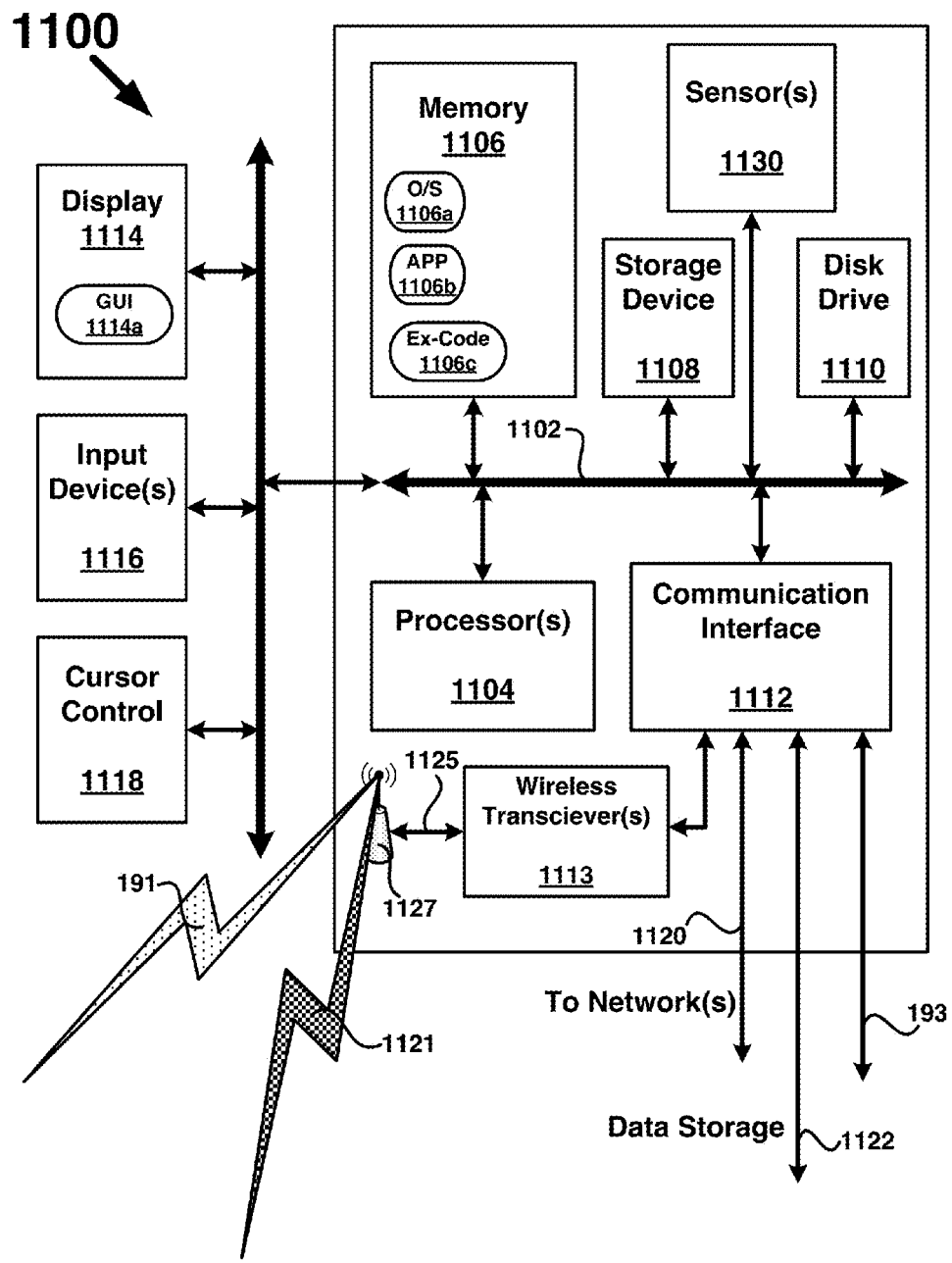
FIG. 11 depicts an example of a computer system.

FIG. 11 illustrates an exemplary computer system 1100 suitable for use in one or more systems, devices, compute engines, apparatus, client devices, wireless devices, wireless systems, backend systems, front end systems, host devices or others described in reference to FIGS. 1-7 and 10. In some examples, computer system 1100 may be used to implement computer programs, algorithms, an application (APP), an application programming interface (API), configurations, methods, processes, or other software to perform the above-described techniques. Computer system 1100 may include a bus 1102 or other communication mechanism for communicating information, which interconnects subsystems and devices, such as one or more processors 1104 (e.g., µC, µP, DSP, ASIC, FPGA, Baseband, multi-core processor, etc.), system memory 1106 (e.g., RAM, SRAM, DRAM, non-volatile memory, Flash), storage device 1108 (e.g., Flash, ROM), disk drive 1110 (e.g., magnetic, optical, solid state), communication interface 1112 (e.g., modem, Ethernet, WiFi, Cellular), display 1114 (e.g., CRT, LCD, LED, OLED, touch screen), input device 1116 (e.g., keyboard, stylus, touch screen, mouse, track pad), and cursor control 1118 (e.g., mouse, trackball, stylus). Some of the elements depicted in computer system 1100 may be optional, such as elements 1114-1118, for example, and computer system 1100 need not include all of the elements depicted. Display 1114 may present a user interface (UI), such as a graphical user interface (GUI) 1114a. Memory 1106 may include computer executable programs and/or data embodied in a non-transitory computer readable medium, such as an operating system (OS) 1106a, an application (APP) 1106b, and executable code (Ex-Code) 1106c, for example. APP 1106b may control presentation of images (e.g., icons, display objects, contextually relevant information, etc.) on GUI 1114a, for example. A data file received via communications interface 1112 may be processed by APP 1106b to generate data and/or signals to control presentation of images on display 1114 (e.g., using GUI 1114a), for example.

According to some examples, computer system 1100 performs specific operations by one or more processors 1104 executing one or more sequences of one or more instructions stored in system memory 1106. Such instructions may be read into system memory 1106 from another non-transitory computer readable medium, such as storage device 1108 or disk drive 1110 (e.g., a HDD or SSD). In some examples, circuitry may be used in place of or in combination with software instructions for implementation. The term "non-transitory computer readable medium" refers to any tangible medium that participates in providing instructions and/or data to processor(s) 1104 for execution. Such a medium may take many forms, including but not limited to, non-volatile media and volatile media. Non-volatile media includes, for example, optical, magnetic, or solid state disks, such as disk drive 1110. Volatile media includes dynamic memory, such as system memory 1106. Common forms of non-transitory computer readable media includes, for example, floppy disk, flexible disk, hard disk, SSD, magnetic tape, any other magnetic medium, CD-ROM, DVD-ROM, Blu-ray® disc, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Sensor(s) 1230 may include but are not limited to one or more inertial sensors (e.g., an accelerometer, a multi-axis accelerometer, a gyroscope, a magnetometer, etc.), an altimeter, and a barometer, for example. One or more sensors in sensor(s) 1230 may be used to determine location data for a device that includes computer system 1100 and/or is in communication with computer system 1100 (e.g., a wireless computing device, a mobile computing device, a client device, a smartphone, a tablet, a pad, a laptop, PC, a wireless device, a portal computing device, a computing device, a networked computing device, a platform, a backend service, etc.). One or more of the memory 1106, storage device 1108, or disk drive 1110 may be accessed as a data store for location data from sensor(s) 1230 or other systems in communication (e.g., via communications interface 1112) the computer system 1100. Location data may be communicated (191, 1121) to/from the computer system 1100 via one or more of the wireless transceivers 1113 (e.g., one or more radios). Sensor(s) 1230 may include a transducer (e.g., a microphone) to capture audio signals, such as voice of a user, traveler, or the like. For example, traveler 101 may speak a current location of the traveler 101 and systems in device 110 may process the speech and convert the speech into location data. Data for a review or other experience related to one or more events may be captured by the microphone and converted into another data format, such text for example.

For example, radio frequency signal sources including but not limited to GPS satellite signals (e.g., signals 191 from one or more GPS satellites 287), terrestrial location transmitters (e.g., one or more cellular towers), WiFi signals, WiMAX signals, WiFi routers, WiFi access points, Bluetooth® signals (e.g., Bluetooth® beacons), near field communication signals, iBeacon™ beacons, data from external resource 299, and networked system 150. Other signal and/or data sources for location data may include but are not limited to audio signals (e.g., ultrasonic signals) and signals and/or data generated by location tracking software (e.g., internal to and/or external to computer system 1100), for example. In some examples, location data and/or signals may be communicated wireless via a communications link (e.g., 191, 1121) and/or a wired communications link (e.g., 193, 1120, 1122). Location data accessed by computer system 1100 may include but is not limited to a location history data base (e.g., 468, 147) and location data 462, for example. The location data may be updated, revised or otherwise change on a dynamic basis as the guest device 110 moves 129 around in areas around event 120.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media may include coaxial cables, copper wire, and fiber optics, including wires that comprise bus 1102 for transmitting a computer data signal or other signals (e.g., from hardware or circuitry). In some examples, execution of the sequences of instructions may be performed by a single computer system 1100. According to some examples, two or more computer systems 1100 coupled by communication link 1120 (e.g., LAN, Ethernet, PSTN, USB, or wireless network) may perform the sequence of instructions in coordination with one another. Computer system 1100 may transmit and receive messages, data, and instructions, including programs, (i.e., application code), through communication link 1120 and communication interface 1112. Received program code may be executed by processor 1104 as it is received, and/or stored in disk drive 1110, or other non-volatile storage for later execution. Computer system 1100 may optionally include a wireless transceiver 1113 coupled with the communication interface 1112 and coupled 1115 with an antenna 1117 for receiving and generating RF signals (191, 1121), such as from a WiFi network, WiMAX network, BT radio, Cellular network, networked computing resources, external resource 299, client devices (e.g., 110), owner devices (e.g., 113), near field communication (NFC), satellite network, data storage network, or other wireless network and/or wireless devices, for example. Examples of wireless devices (e.g., client devices) may include but is not limited to those depicted in FIGS. 1-7 and 10. Communications interface 1112 may be coupled 1122 with data storage external to computer system 1100. Communications interface 1112 may be coupled 193 with external resources and/or systems, such as those depicted in FIGS. 1-7 and 10, for example. Computer system 1100 may be used to implement a computing device (e.g., 110, 113), a portal computing device (e.g., 230, 277, 480), a networked computing device (e.g., 453, 455, 459), a networked system (e.g., 150), and an external resource (e.g., 299), for example.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A system comprising:
    a computing resource;
    a data storage resource; and
    a communications interface, the communications interface in communication with the computing resource and the data storage resource,
    wherein the computing resource is configured to execute instructions embodied in a non-transitory computer readable medium to at least:
        access, from the data storage resource, one or more of location data, temporal data, and event data associated with a property rental;
        access, from the data storage resource, preference data associated with a user;
        determining to include, in a user interface, a first display object representing information associated with a first event that is external to a location of the property rental, wherein the first display object is determined to be included in the user interface based at least partly on the preference data and one or more of the location data, the temporal data, and the event data;
        classify the first display object into a first event period of a plurality of event periods;
        assign a first visual display characteristic to the first display object based at least partly on one or more of the temporal data, the location data and the event data;
        generate a first data file comprising data representing the first display object and the first visual display characteristic, wherein the user interface is configured to present the first display object using the first visual display characteristic;
        communicate the first data file for display of the user interface;
        determine to include, in the user interface, a second display object representing information associated with a second event that is external to the location of the property rental, wherein the second display object is determined to be included in the user interface based at least partly on the preference data and a change to one or more of the location data, the temporal data, and the event data;
        assign a second visual display characteristic to the second display object based at least partly on the preference data and a change to one or more of the location data, the temporal data and the event data;
        generate a second data file for the user interface, the second data file comprising data representing the second display object and the second visual display characteristic, wherein the user interface is configured to present the second display object using the second visual display characteristic; and
        communicate, using the communications interface, the second data file for display of the user interface.

2. The system of claim 1, wherein the first visual display characteristic determines one or more of a color, shape, size, display position, or brightness of the first display object as presented by the user interface.

3. The system of claim 1, wherein the user interface is implemented by an application executed by the computing resource, the application configured to present the user interface on a display coupled with the computing resource.

4. The system of claim 3, wherein the first visual display characteristic identifies whether the first display object is configured as a touch-selectable object.

5. The system of claim 1, wherein the plurality of event periods includes a pre-event period, a during-event period, and a post-event period.

6. The system of claim 5, wherein when the pre-event period, the during-event period or the post-event period comprises a contextually-relevant period for the property rental, and the user interface presents display objects for the contextually-relevant period.

7. The system of claim 1, wherein the computing resource is further configured to execute the instructions to at least:
   receive data including one or more of updated location data, updated temporal data and updated event data;
   process one or more of the updated location data, the updated temporal data and the updated event data; and
   classify the second display object into a second event period of the plurality of event periods based at least partly on the processing one or more of the updated location data, the updated temporal data and the updated event data.

8. The system of claim 1, wherein the temporal data includes a stay date range, the location data includes one or more stay locations, and the event data includes one or more stay events.

9. The system of claim 1, wherein the plurality of event periods includes a pre-event period, and wherein a visual display characteristic for at least one display object in the pre-event period is different than a visual display characteristic for other display objects in the pre-event period.

10. The system of claim 1, wherein the plurality of event periods includes a during-event period, and wherein a visual display characteristic for at least one display object in the during-event period is different than a visual display characteristic for other display objects in the during-event period.

11. The system of claim 1, wherein the plurality of event periods includes a post-event period, and wherein a visual display characteristic for at least one display object in the post-event period is different than a visual display characteristic for other display objects in the post-event period.

12. The system of claim 1, wherein the computing resource is further configured to execute the instructions to at least select the first event based at least partly on a type of the first event corresponding to a type of event preferred by the user, wherein the preference data represents the type of event preferred by the user.

13. The system of claim 1, wherein the computing resource is further configured to execute the instructions to at least select the first event based at least partly on an expected time that the user will be proximate to a location of the first event corresponding to a preferred time of the user to engage in the first event, wherein the preference data represents the preferred time.

14. A computer-implemented method comprising:
   under control of a computing device configured to execute specific computer-executable instructions,
      accessing one or more of location data, temporal data, and event data associated with a property rental;
      accessing preference data associated with a user;
      determining to include, in a user interface, a first display object representing information associated with a first event that is external to a location of the property rental, wherein the first display object is determined to be included in the user interface based at least partly on the preference data and one or more of the location data, the temporal data, and the event data;
      classifying the first display object into a first event period of a plurality of event periods;
      assigning a first visual display characteristic to the first display object based at least partly on one or more of the temporal data, the location data, and the event data;
      generating a first data file for a user interface, the first data file comprising data representing the first display object and the first visual display characteristic, wherein the user interface is configured to present the first display object using the first visual display characteristic;
      communicating the first data file for display of the user interface;
      determining to include, in the user interface, a second display object representing information associated with a second event that is external to the location of the property rental, wherein the second display object is determined to be included in the user interface based at least partly on the preference data and a change to one or more of the location data, the temporal data, and the event data;
      assigning a second visual display characteristic to the second display object based at least partly on one or more of the location data, the temporal data, and the event data;
      generating a second data file for the user interface, the second data file comprising data representing the second display object and the second visual display characteristic, wherein the user interface is configured to present the second display object using the second visual display characteristic; and
      communicating the second data file for display of the user interface.

15. The computer-implemented method of claim 14, wherein the communicating the first data file comprises transmitting the first data file to a second computing device via a communications link between the second computing device and a communications interface coupled with the computing device, the second computing device including a display.

16. The computer-implemented method of claim 14, further comprising:
   receiving, via a communications interface in communication with the computing device, data including one or more of updated location data, updated temporal data and updated event data;
   processing one or more of the updated location data, the updated temporal data and the updated event data; and
   classifying the second display object into a second event period of the plurality of event periods based at least partly on the processing one or more of the updated location data, the updated temporal data and the updated event data.

17. The computer-implemented method of claim 14, wherein the communicating the second data file comprises transmitting the second data file to a second computing device via a communications link between the second computing device and a communications interface coupled with the computing device, the second computing device including a display.

18. The computer-implemented method of claim 14, wherein the accessing the location data further comprises:
   accessing one or more other location data sources comprising one or more of GPS satellite signals, assisted GPS, synthetic GPS, terrestrial location transmitters, wireless personal area network beacons, wireless personal area network signals, near field communications, WiFi radio signals, relative radio frequency signal strength, received signal strength indication, cell ID, audio signals, and an inertial sensor.

19. The computer-implemented method of claim 14, further comprising:

analyzing the location data to determine that the user has changed from using a first route to the property rental to using a second route to the property rental; and selecting the second event based on a location of the second event being proximate to a portion of the second route.

20. The computer-implemented method of claim 14, further comprising selecting the first event based at least partly on an expected time that the user will be proximate to a location of the first event corresponding to a preferred time of the user to engage in the first event, wherein the preference data represents the preferred time.

\* \* \* \* \*